Jan. 12, 1965
C. A. KIRBY
3,165,144
EXPANDABLE CLOSURE MEMBER
Filed March 22, 1963
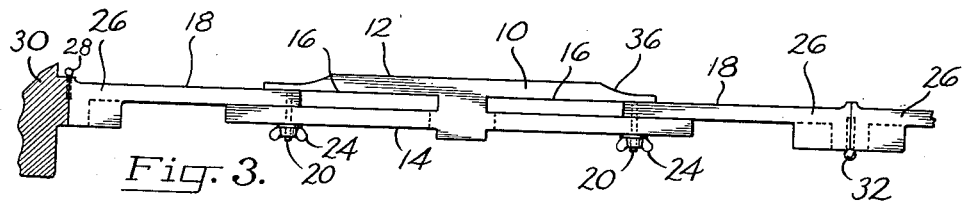
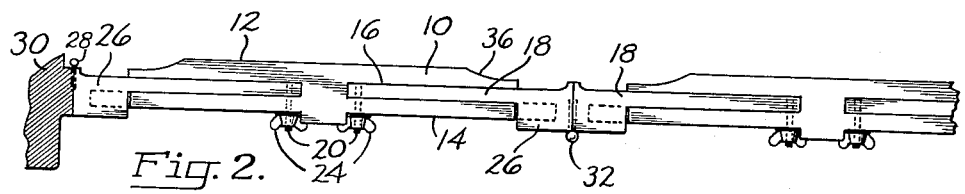
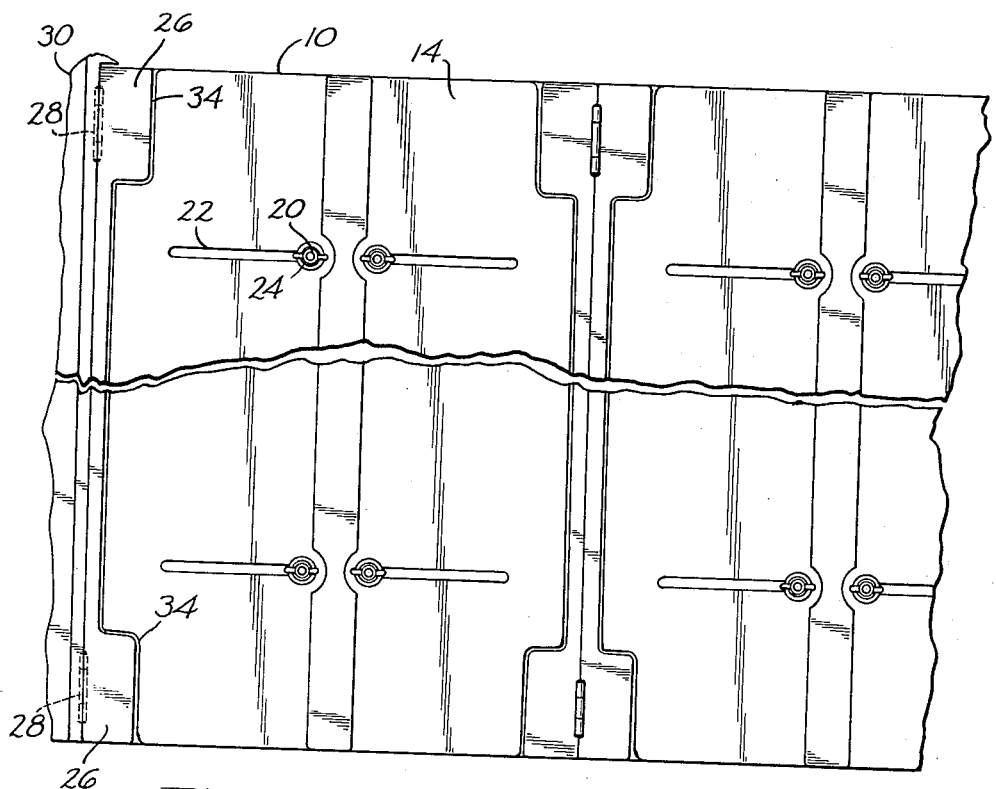
Charles A. Kirby
INVENTOR.
BY Eugene O. Farley
Atty.

United States Patent Office 3,165,144
Patented Jan. 12, 1965

3,165,144
EXPANDABLE CLOSURE MEMBER
Charles A. Kirby, Tacoma, Wash., assignor to Allied Building Components, Inc., Tacoma, Wash., a corporation of Washington
Filed Mar. 22, 1963, Ser. No. 267,187
4 Claims. (Cl. 160—221)

This invention relates to a new and novel expandable closure member and is particularly adaptable for use as doors, windows, or like structures.

A primary objective of the present invention is to provide a novel association of panels in the formation of a closure member wherein the latter through such novel association is laterally expandable and thereby capable of fitting in openings of various sizes.

A more particular object is to provide an expandable closure member which utilizes a first panel member having side edge grooves for adjustable reception of second panel members and including releasable fastening means for securing the panels together in adjusted relation.

Another object is to provide an expandable closure member utilizing laterally adjustable telescoping panel members some of which have rearwardly extending enlargements for the reinforced attachment thereto of mounting means such as hinges or hanger elements.

It is a further object to provide an expandable closure member having laterally adjustable telescoping panel members and fastening means for connecting the panel members together which are visible only from the rear of the closure member, leaving the front surface unobstructed by hardware.

Still another object is to provide an expandable closure member which is simple in construction and inexpensive to manufacture.

Briefly stated, the present closure member comprises a first panel member having grooves leading inwardly from its side edges for the telescoping reception of second panel members. The first panel member has transversely extending slots on its rear surface and the second panel members have integral studs projecting through the slots and adapted for receiving a securing nut for clamping the panel members together in adjusted position. The second panel members are provided with rearwardly projecting enlargements for the reinforced attachment of mounting means.

The invention will be better understood and additional objects thereof will become more apparent from the accompanying specification and claims considered together with the accompanying drawings, wherein like numerals of reference indicate like parts, and wherein:

FIG. 1 is a fragmentary rear elevational view of an expandable closure member assembly embodying the features of the present invention;

FIG. 2 is a fragmentary plan view of the assembly and showing a retracted relation of the adjustable panel members; and FIG. 3 is a fragmentary plan view showing the panel member in expanded relation.

The present closure member is adaptable for use for varied purposes and is particularly useful as a door structure. It comprises an H-shaped frame 10 having a front face or surface 12 and a rear face or surface 14. In its use, the frame 10 comprises a panel portion of the door and its H-shaped structure is formed by grooves 16 leading inwardly from each of the side edges. These grooves extend the full longitudinal length of the frame.

Associated with the panel member 10 are second panel or wing members 18. Panels 18 have a sliding fit in the recesses 16 and are adapted for inward telescoping movement to decrease the width of the door or an outward telescoping movement to decrease the width of the door.

Fastening means are provided for connecting the first and second panels in adjusted relation, and for this purpose the panels 18 have integral studs 20 projecting rearwardly through elongated, transversely disposed slots 22 in the rear wall of the first panel member 10. Wing nuts 24 are threaded on the studs and are adapted releasably to clamp the panel members together. Slots 22 are of a length sufficient to accomplish the necessary lateral adjustment, it being preferred to utilize at least two fastener assemblies in the length of the door.

In addition to adjustably connecting the panel members, the studs 20 support the first panel member 10 on the second panel members 18.

Panel members 18 are provided with upper and lower rearwardly projecting enlargements 26. These enlargements form reinforced portions to which hinges 28 may be attached for hingedly connecting the door to a frame portion 30 as shown at the left side in FIGURES 1, 2 and 3 or if desired to another door panel by suitable hinges 32 to form a bi-fold or multiple-fold door, the hinges 28 and 32 being inset in the side edges of the panels 18 to allow close abutment of such edges.

It is to be understood that the closure member may be supported by means other than hinges 28 such as for example by hangers from overhead tracks. In each case, however, the hardware for supporting the closure member is attached to the enlargements 26.

As best seen in FIGURE 1, the rear of the panel 10 has cut out portions 34 to receive the enlargements 26 in the retracted condition of the panels.

For the purpose of fitting the present door in an opening, the wing nuts 24 are loosened and the panels 18 selectively adjusted in the panel 10 and the wing nuts tightened. Either a minute adjustment or a wide adjustment can be made, and thus the present door is adapted to a wide range of door openings. It may be installed either as a right or left hand door.

The versatility of the present door results from the telescoping relation of the door panels themselves rather than by narrow frame members thereof. At the same time, the front face of the door is unobstructed except for the edge portions of frame 10, and as seen in FIGURES 2 and 3, these edge portions may be beveled or otherwise ornamented as at 36 to enhance the appearance of the door. The adjusting hardware projects rearwardly and is not visible from the front.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. An expandable closure member for framed openings comprising a first elongated panel member of substantially H-shape cross section providing laterally spaced elongated grooves leading inwardly from each of its side edges and extending the full length thereof, a pair of second elongated panel members of substantially the same length as and disposed on opposite sides of the first panel member and each having a portion thereof slidably received in a different one of the grooves for adjusting the width of the closure member by selective penetration of the second panel members in the grooves, a pair of laterally extending, elongated slots leading inwardly from the rear surface of the first panel member and communicating with respective ones of the grooves, stud means integral with each of the second panel members and projecting through the associated slot, nut means on the studs for securing the first and second panel members together in adjusted relation, and longitudinally spaced rearwardly projecting enlargements on at least one of the second panel members for reinforced attachment of mounting means, each first panel member associated with a second panel member having said enlargements being recessed in the areas of said enlargements to accommodate full retraction of the second panel member into the associated groove of the first panel member.

2. An expandable door for mounting in framed openings comprising a first elongated panel member of substantially H-shape cross section providing laterally spaced elongated grooves leading inwardly from each of its side edges and extending the full length thereof, a pair of second elongated panel members of substantially the same length as and disposed on opposite sides of the first panel member and each having a portion thereof slidably received in a different one of the grooves for adjusting the width of the door by selective penetration of the second panel members in the grooves, and releasable fastening means interengaging the first panel member and each of the second panel members for adjustably connecting the second panel members to the first panel member, one of the second panel members having longitudinally spaced hinge support portions for mounting said second panel member pivotally on the frame of a door opening.

3. The expandable door of claim 2 in the form of a bi-fold door wherein there are included two assemblies of the first and second panel members and wherein the adjacent second panel members have hinge support portions supporting longitudinal axis hinge means securing together the adjacent second panel members of the two assemblies, each hinge support portion including a rearwardly projecting enlargement and each first panel member being recessed in the area of each of said enlargements to accommodate full retraction of the second panel members into the associated grooves of the first panel members.

4. The expandable door of claim 2 wherein the hinge support portions include rearwardly projecting enlargements, the first panel member associated with the second panel member having said enlargements being recessed in the areas of said enlargements to accommodate full retraction of the second panel member into the associated groove of the first panel member.

References Cited in the file of this patent

UNITED STATES PATENTS

| | | |
|---|---|---|
| 565,304 | Shankey | Aug. 4, 1896 |
| 764,440 | Ellis | July 5, 1904 |
| 1,382,927 | Mooers | June 28, 1921 |
| 2,258,523 | Van Atta | Oct. 7, 1941 |
| 2,800,127 | Flynn | July 23, 1957 |
| 3,000,063 | Hoog | Sept. 10, 1961 |